| United States Patent [19] | [11] | 4,100,131 |
|---|---|---|
| Manier et al. | [45] | Jul. 11, 1978 |

[54] SPIN DYEING OF ACRYLIC FIBRES

[75] Inventors: Francis René Daniel Manier, Cinqueux; Pierre Léon Adolphe Caullet, Taverny, both of France

[73] Assignee: Produits Chimiques Ugine Kuhlmann, Paris, France

[21] Appl. No.: 544,539

[22] Filed: Jan. 27, 1975

[30] Foreign Application Priority Data

Feb. 8, 1974 [FR] France ............................ 74 04248

[51] Int. Cl.$^2$ .............................................. C08K 5/00
[52] U.S. Cl. ................................... 260/42.21; 8/41 A; 8/177 AB
[58] Field of Search ............. 260/42.21, 37 N, 37 NP, 260/37 P; 8/162 S, 177 AB, 41 A

[56] References Cited

U.S. PATENT DOCUMENTS

| 2,510,090 | 6/1950 | Masi | 260/79.5 P |
|---|---|---|---|
| 2,657,190 | 10/1953 | Bancs | 260/79.5 B |
| 3,346,585 | 10/1967 | Dehnert | 8/177 AB |
| 3,574,200 | 4/1971 | Brack | 8/177 AB |
| 3,592,792 | 7/1971 | Newland | 260/42.21 |
| 3,647,349 | 3/1972 | Raue et al. | 8/177 AB |

FOREIGN PATENT DOCUMENTS

| 1,212,939 | 10/1959 | France. |
|---|---|---|
| 2,103,307 | 7/1971 | France. |
| 2,145,657 | 7/1972 | France. |

Primary Examiner—Lewis T. Jacobs
Attorney, Agent, or Firm—Beveridge, DeGrandi, Kline & Lunsford

[57] ABSTRACT

The present invention provides a process for the spin dyeing of acrylic fibre obtained by spinning a collodion of a homopolymer or copolymer of acrylonitrile, in which the coloring agent comprises at least one nitrate of a cationic dyestuff; it also provides textile fibres based on a homopolymer or copolymer of acrylonitrile which have been dyed in accordance with such a process.

10 Claims, No Drawings

SPIN DYEING OF ACRYLIC FIBRES

The invention relates to the spin dyeing of acrylic fibres by means of the nitrates of cationic dyestuffs.

The processes which are known and usually used for obtaining acrylic fibres comprise passing a solution — called collodion — of homopolymers or copolymers of acrylonitrile in a suitable solvent through spinnerets pierced with very tiny holes usually having a diameter of approximately 5/100ths of a millimeter and then eliminating the solvent to coagulate the polymer in the form of fibres or filaments.

Amongst the most frequently used solvents are: dimethylformamide, dimethylacetamide and dimethylsulphoxide.

The most common technique for eliminating the solvent comprises diluting the solvent in a non-solvent bath of the polymer, called a coagulation bath, thus causing the polymer to precipitate from its solution as soon as it leaves the spinneret. The non-solvent is generally miscible with the solvent. The coagulation bath very often comprises water containing a greater or lesser quantity of the solvent which was used to dissolve the polymer.

Acrylic fibres may be coloured by adding colouring matters to the collodion before spinning.

If these colouring matters have affinity for polymers, such an operation is usually called "spin dyeing".

To spin dye or colour acrylic fibres, colouring matters soluble in the collodion or pigments completely insoluble in the collodion have been used.

Dyestuffs of intermediate solubility cannot be suitable because very often, in this case, the equilibrium between the soluble and insoluble fractions is unstable and its development considerably disturbs the course of spinning.

As is well-known, serious problems arise from using pigments. One of these problems is that very few pigments are in fact completely insoluble in the spinning solvents or the coagulation bath. Another problem arises from the necessity of effecting very fine dispersion of the pigment in the collodion.

These problems are avoided by the use of dyestuffs which are soluble in the collodion, the most frequently recommended ones being cationic dyestuffs or their salts.

Very many types of anions have been mentioned as being able to be associated with various families of known dyestuff cations. Thus, French Pat. No. 2,143,289 mentions more than 210 of them. They may be obtained from various acids: mineral or organic, and in this latter case, derivatives of saturated or unsaturated aliphatic, cycloaliphatic, aromatic or heterocyclic carboxylic or sulphonic acids.

It has hitherto been admitted that the nature of these anions did not play any role with respect to the properties of the dyestuffs and that only the nature of the cation was of importance. Such affirmation is found, for example, in French Pat. Nos. 2,030,081, 1,533,149 and 1,595,666.

However, as is well-known according to French Pat. Nos. 2,145,657 and 2,103,307 to increase the solubility of cationic dyestuffs when using them in an organic solvent medium, it is preferable to associate them with anions derived from mono- or dicarboxylic acid residues having 4 to 30 carbon atoms or from sulphonic acids, whereas French Pat. No. 1,212,939, recommends more particularly associating them with anions derived from sulphonic acids such as aliphatic or aromatic sulphonic acids, especially propane-1,3-disulphonic acid, benzene-mono or disulphonic acid, naphthalene-mono or poly-sulphonic acids, diphenyl-4-sulphonic acid and the products resulting from the condensation of formaldehyde with 4,4'-dihydroxy-phenyl sulphone containing sulphonic groups.

We have ascertained however, that the cationic dyestuffs associated with the anions mentioned above present several problems when applied to the spin dyeing of acrylic fibres.

To be acceptable for spin dyeing acrylic fibres, a cationic dyestuff must in fact give good results at the same time from the point of view of brightness of shade, absence of bleeding, solubility in the collodion and tinctorial yield. However, in practice it proves to be very difficult to obtain cationic dyestuffs which are acceptable for spin dyeing acrylic fibres when these dyestuffs comprise, on the one hand, one and the same anion chosen from those mentioned above, and on the other hand, dyestuff cations of different chemical natures. Very often in practice, therefore, one is led to use different anions when one has recourse to different dyestuff cations.

Moreover, there are frequent cases where mixtures of dyestuffs are used for spin dyeing acrylic fibres. In this event, duller shades are obtained which are different from those envisaged having regard to the individual shades of each of the components, probably because of exchange reactions between different anions.

We have discovered that, contrary to the hitherto established state of the art, the nitrates of cationic dyestuffs lead to results which are clearly superior to those obtained most frequently with other anions, and that, unexpectedly, this advantageous result is general whatever the chemical family to which the dyestuff cation belongs.

According to the present invention therefore a process is provided for the spin dyeing of acrylic fibre obtained by spinning a collodion, of a homopolymer or copolymer of acrylonitrile in which the colouring agent comprises at least one nitrate ($NO_3-$) of a cationic dyestuff.

The superior results obtained with the nitrates of cationic dyestuffs used in accordance with the new process are shown by the following list of advantageous properties comprising:

(1) good solubility in the usual spinning solvents;

(2) an intensity of colouration clearly superior to that achieved comparatively with chloride, phosphate, chlorozincate, thiocyanate, formate, acetate, citrate or other anions;

(3) the elimination of the above-mentioned disadvantages linked with the risk of an exchange of anions when a mixture of dyestuffs is used in which several dyestuff cations are associated with several different types of anions;

(4) maintaining the shade of the dyestuffs practically without any change during the whole spin dyeing operation;

(5) a very important decrease or even very frequently a total absence of any risk of the dyestuff bleeding in the coagulation baths. This point is particularly important, because very often only one bath is used to coagulate filaments leaving spinnerets supplied by differently coloured collodions. If one or more of these collodions allows even slight quantities of dyestuffs to bleed, these quantities when being deposited upon fibres of a different colour alter the appearance of these fibres, thus sometimes causing significant losses in merchandise.

If this happens, as is frequently the case with the dyestuffs recommended hitherto, it is then necessary to purify the coagulation baths to eliminate therefrom the traces of dyestuff. This operation is always very long and delicate.

For each type of dyestuff cation, the superiority of its association with the nitrate ion may be shown more particularly in one or other of the above-mentioned fields or most frequently by a more advantageous general result in these fields taken together.

Other fields in which the superiority of the nitrates appears for each type of dyestuff cation are for example those of fastness to light, to washing, to rubbing and to cleaning in solvent media, for the dyeings obtained which were subjected to the appropriate normalized tests (normalization according to the "International Standard Organisation").

All types of dyestuff cations suitable for dyeing acrylic fibres in aqueous or organic solvent medium may be associated with the nitrate anion ($NO_3-$) in accordance with the invention.

Examples of dyestuff cations included within the scope of the invention are triphenylmethylium dyestuffs, dyestuffs carrying an ammonium group on a side chain, cycloammonium dyestuffs, i.e. dyestuffs having a heterocycle containing nitrogen and whose tertiary nitrogen is quaternized by an alkyl group. Some examples thereof are the indazolium, imidazolium, benzimidazolium, pyrylium, pyrazolium, pyridinium, pyridazinium, pyrazolinium, triazolium, thiazolium, benzothiazolium, oxazolium, benzoxazolium, oxadiazolium, thiadiazolium, quinolium, indolinium and benz (c d) indolium groups.

As is well-known, the nitrate of the cationic dyestuff may be isolated according to several alternative methods.

The dyestuff base may be obtained by neutralizing in ammonia an aqueous solution of a salt of the dyestuff cation, isolating the base, putting this in suspension in water, forming the nitrate by the addition of dilute nitric acid, then isolating the nitrate by filtration or decantation, washing and drying.

A double decomposition reaction of the salts may also be effected by adding to the aqueous solution of a dyestuff cation salt an aqueous solution of sodium or potassium nitrate. The nitrate is precipitated and isolated conventionally.

According to one advantageous embodiment of the invention, the nitrates of cationic dyestuffs are used in the form of a stock solution in the same solvent as that used for the production of the spinning collodion, and this stock solution is injected continuously into the circuit carrying the collodion towards the spinneret. The stock solution generally contains 1% to 30%, preferably 2% to 20%, of dyestuff nitrate or a mixture of several of these nitrates.

The uncoloured collodions generally contain 15% to 25% of homopolymer or copolymer of acrylonitrile.

According to an optional embodiment of the invention, the same acrylonitrile homopolymer or copolymer as that used for the preparation of the collodion may be added to the stock solution of cationic dyestuff nitrate in a proportion which may extend to 20% but which is often in the order of 5% by weight of the stock solution in the collodion.

When, according to the invention, mixtures of nitrates of several different dyestuffs are used, there mixtures may be effected from the stock solutions of each dyestuff which are incorporated separately in adequate proportion in the spinning collodion, or from one single stock solution containing the various dyestuffs in the desired proportions.

The invention includes acrylic fibres which have been spun dyed in accordance with the new process.

In the present application "bleeding" should be understood as bleeding in the regeneration bath and "lack of solubility" as lack of solubility in the spinning collodion.

The invention is illustrated by the following Examples in which the parts and percentages are expressed by weight unless otherwise stated.

EXAMPLE 1

A stock solution is prepared in a container provided with a mixing device, this stock solution containing:

10 parts by weight of 4'-amino-3'-chloro-3-phenylazo-1,2-dimethylindazolium nitrate 85 parts by weight of dimethylformamide 5 parts of a compound obtained by copolymerizing 94% by weight of acrylonitrile and 6% by weight of methyl methacrylate.

With the aid of an arrangement currently used for the spin colouration of chemical fibres, comprising a metering device and another homogenizer for continuously mixing two liquids having different rates of flow and similar viscosity, 2 parts of the stock solution of dyestuff and 100 parts of a collodion comprising 80% of dimethylformamide and 20% of the same copolymer as that entering the composition of the stock solution of the dyestuff are homogenized.

This collodion which is thus coloured is then extruded through a spinneret immersed in a coagulation bath containing 60% of dimethylformamide and 40% of water. The filaments thus obtained are drawn out and washed and then, according to conventional spinning conditions, they are subjected to one or several fixing treatments before being oiled and dried. They have a very bright and very intense scarlet shade. These filaments are dyed by 1% of the cationic dyestuff nitrate.

It is found that the coagulation bath and the baths of the subsequent treatments remain practically colourless, even after a prolonged spinning period.

If the formate acetate or phosphate of the same dyestuff cation are used then a change of shade takes place, with the formate bleeding occurs and the phosphate shows a lack of solubility.

EXAMPLE 2

In accordance with the conditions of Example 1, filaments are obtained containing 1% of [benzene]-<azo 1>-[benzene]-<4 azo 7>-[1,2-dimethyl-6-hydroxy indazolium] nitrate. All the baths for treating these filaments, once they leave the spinneret, remain colourless.

If, instead of the dyestuff cation nitrate, the corresponding chloride is used, it is found that the coagulation bath becomes progressively turbid with dyestuff. The same occurs with other anions such as, for example, sulphate or phosphate.

This loss of dyestuff could make it necessary to purify the bath very often and, moreover, it is shown by a less intense colouration of the filaments whose fastness to washing is not as good as that of the fibres which have been coloured an intense orange shade by the cationic dyestuff nitrate.

If the chlorozincate, chloride, phosphate or sulphate of the same dyestuff cation are used there is a lack of solubility and of tinctorial strength. With the sulphate, phosphate and chloride bleeding also occurs.

EXAMPLE 3

A stock solution of dyestuff is obtained containing:

4 parts of 4'-phenoxysulphonyl-7-phenylazo-6-amino 1,2-dimethyl indazolium nitrate 6 parts of 4'-diethylamino-3-phenylazo-5-nitro-1,2-dimethylindazolium nitrate 85 parts of dimethylacetamide 5 parts of a copolymer obtained from 91% of acrylonitrile and 9% of methyl acrylate, and it is injected into the circuit of the spinning collodion, at the rate of 4 parts of concentrated solution to 100 parts of collodion.

This collodion comprises 80% of dimethylacetamide and 20% of the same copolymer as that entering the composition of the stock solution of dyestuff.

The filaments leaving the spinneret are coagulated in a bath containing 66% of dimethylacetamide and 34% of water. They are dyed by 2% of the total of the two yellow and blue dyestuffs. Despite the very intense green colouration thus obtained, no bleeding of dyestuff is discovered throughout the cycle of the treatments which follow extrusion.

The 4'-diethylamino-3-phenylazo-5-nitro-1,2-dimethyl indazolium cation shows a change in shade for acetate, formate, phosphate, sulphate and thiocyanate. With the acetate and phosphate bleeding also occurs and the chlorozincate, chloride and thiocyanate are lacking in tinctorial strength.

EXAMPLE 4

The stock solution of dyestuff comprises:

5 parts of N-cyclohexyl-4'-amino-2-naphthyl-1-methylbenz (c d) indolinium nitrate 90 parts of dimethylsulphoxide 5 parts of the same copolymer as in Example 1.

This copolymer in 20% solution in the dimethylsulphoxide constitutes the collodion, 100 parts of which are mixed with 3 parts of the stock solution of dyestuff.

Regeneration occurs in a bath containing 50% of dimethylsulphoxide in water.

Thus filaments are obtained of a very bright blue shade containing 0.75% of the dyestuff without the coagulation and washing baths being dyed blue.

EXAMPLE 5

Under the same conditions as in Example 1, 10 parts of N(trimethylammonio-ethyl)-N-ethyl-4'-amino-2'-methyl-4-nitro-2-chloroazobenzene nitrate are used. Thus fibres are obtained which have a very intense and very bright red colouration.

If the chloride of this same dyestuff cation is used, it is necessary to use 15 parts of dyestuff to obtain the same intensity of colouration. The chloride is lacking in tinctorial strength.

EXAMPLE 6

Under the conditions described in Example 1, 1 part of the fluorescent brightening agent, comprising 4'-methoxy-4-naphthalimido-1,3,5-trimethylpyrazolium nitrate is used. Thus polyacrylonitrile fibres are produced which are of a much purer white than that of fibres not containing this compound. The degree of whiteness indicated by the measurement of the reflection of light is 89% for the fibres containing the compound compared with 77% for those fibres not containing it, this measurement being made with respect to the normal white standard. The latter, comprising magnesium oxide, is considered to have a reflecting power of 100%.

An examination carried out with ultra-violet light on a sample from the coagulation bath does not permit fluorescence to be detected, though this could have been a sign of bleeding of the compound.

The effect of the increase in the degree of whiteness which was found then resists perfectly the various treatments which the fibres may undergo, in particular chemical bleaching by sodium chlorite and exposure to light.

EXAMPLE 7

(2-chlorophenyl) (4-dimethylaminophenyl) (N-ethyl-N-trifluoroethyl amino phenyl) methylium nitrate is prepared in the following manner;

18.5 parts of the base of the dyestuff are dissolved in 50 parts by volume of xylene after the addition of 50 parts of water, this is cooled to +15° C and, whilst maintaining this temperature, 40 parts by volume of normal nitric acid are added within the space of half an hour. The mixture is stirred for one hour then the liquid phase is decanted, the insoluble part is washed in water then dried at reduced pressure. 18 parts of nitrate of the dyestuff are thus obtained.

5 parts of the dyestuff are used in accordance with the process of Example 4. Fibres are thus obtained which are coloured a very strong blue shade without any bleeding occurring during coagulation or subsequent treatments.

If the nitrate ($NO_3-$) of this dyestuff is replaced by its citrate, an approximately 40% less intense colouration is obtained and, moreover, the coagulation bath becomes progressively blue in colour.

EXAMPLES 8 TO 18

For each of these Examples, an operation is carried out which is similar to that described in Example 1, replacing the dyestuff of Example 1 by each of the dyestuffs in the following Table respectively:

| Ex. NO. | Formula of the dyestuff | Colouration obtained |
| --- | --- | --- |
| 8 | 4'-chloro-7-phenylazo-6-hydroxy-1,2-dimethylindazolium nitrate | yellow |
| 9 | 4'-nitro-2'-methyl-7-phenylazo-6-amino-1,2-dimethylindazolium nitrate | orange |
| 10 | 4'-amino-3-phenylazo-5-chloro-1,2-dimethylindazolium nitrate | red |
| 11 | 4'-diethylamino-6-phenylazo-3-methoxy-1-methylpyridazinium nitrate | violet |
| 12 | 4'-diethylamino-2'-methoxy-6-phenylazo-3-methoxy-1-methyl-pyridazinium nitrate | red |
| 13 | 4'-diethylamino-2'-methyl-5-phenylazo-3-phenyl-1,2-dimethyl-4-chloropyrazolium nitrate | red |
| 14 | N-(p-ethoxy phenyl)-4'-amino-3-naphthylazo-6-methylsulphonyl-1,2-dimethylindazolium nitrate | blue |
| 15 | N-[$N_1$-(dimethyl) hydrazinio-ethyl] N-ethyl-4'-amino-2'-methyl-4-nitro-2-chloro azo benzene nitrate | red |
| 16 | N-4'-diethylamino-5-phenylazo-4-methyl-1,2,4-triazole-4-ium nitrate | red |
| 17 | 2'-methoxy-7-phenylazo-2-methyl-6'-aminoindazole nitrate | red |

| Ex. NO. | Formula of the dyestuff | Colouration obtained |
|---|---|---|
| 18 | 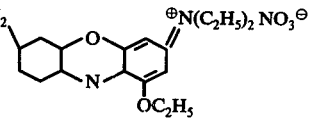 | blue |

The fibres dyed according to these Examples have intense and bright colourations with excellent fastness to washing and no bleeding occurs during coagulation.

If the chlorozincate, chloride or phosphate of the dyestuff cation of Example 9 are used they lack solubility and tinctorial strength. If the acetate, formate, phosphate, sulphate or thiocyanate of the dyestuff cation of Example 10 are used then a change of shade takes place, with the formate bleeding occurs and with the chlorozincate, chloride, phosphate, sulphate and thiocyanate there is a lack of tinctorial strength.

We claim:

1. Process for the spin dyeing of acrylic fibre obtained by spinning a collodion containing 15% to 25% of a homopolymer or copolymer of acrylonitrile, wherein the collodion is dyed by means of at least one nitrate of a cationic dyestuff in which the dyestuff cation is a derivative of a triphenylmethane, contains a cycloammonium group or comprises a side chain carrying a quaternary nitrogen atom, the colouring agent being added to the collodion in the form of a stock solution containing 1% to 30% of dyestuff nitrate.

2. Process according to claim 1 in which the stock solution contains 2% to 20% of nitrate.

3. Process for the spin dyeing of acrylic fibre obtained by spinning a collodion of a homopolymer or copolymer of acrylonitrile, in which the colouring agent is 4'-diethylamino-2'-methyl-5-phenylazo-3-phenyl-1,2-dimethyl-4-chloropyrazolium nitrate.

4. Process for the spin dyeing of acrylic fibre obtained by spinning a collodion of a homopolymer or copolymer of acrylonitrile, in which the colouring agent is [benzene]-<azo 1>-[benzene]-<4 azo 7>-[1,2-dimethyl-6-hydroxyindazolium] nitrate.

5. Process for the spin dyeing of acrylic fibre obtained by spinning a collodion of a homopolymer or copolymer of acrylonitrile, in which the colouring agent is N-cyclohexyl-4'-amino-2-naphthyl-1-methyl-benz (cd) indolinium nitrate.

6. Process for the spin dyeing of acrylic fibre obtained by spinning a collodion of a homopolymer or copolymer of acrylonitrile, in which the colouring agent is 4'-methoxy-4-naphthalimido-1,3,5-trimethylpyrazolium nitrate.

7. Process for the spin dyeing of acrylic fibre obtained by spinning a collodion of a homopolymer or copolymer of acrylonitrile, in which the colouring agent is 4'-chloro-7-phenylazo-6-hydroxy-1,2-dimethylindazolium nitrate.

8. In the process of the spin dyeing of acrylic fibre obtained by spinning a collodion of a homopolymer or copolymer of acrylonitrile, the improvement which comprises contacting the collodion with at least one nitrate of a cationic dyestuff in which the dyestuff cation is a derivative of triphenylmethane, contains a cycloammonium group or comprises a side chain carrying a quaternary nitrogen atom, the colouring agent being added to the collodion in the form of a stock solution containing 1% to 30% of dyestuff nitrate and the uncoloured collodion containing 15% to 25% of the homopolymer or copolymer of acrylonitrile.

9. A process according to claim 8 wherein a mixture of dyestuff cations is used.

10. Textile fibres based on a homopolymer or copolymer of acrylonitrile which have been dyed in accordance with the process claimed in claim 1.